United States Patent [19]

Inoue et al.

[11] Patent Number: 5,388,459
[45] Date of Patent: Feb. 14, 1995

[54] ACCELERATION SENSOR WITH DIRECT MOUNTING

[75] Inventors: Jiro Inoue; Muneharu Yamashita; Jun Tabota; Toshihiro Mizuno, all of Nagaokakyo, Japan

[73] Assignee: Murata Manufacturing Co., Ltd., Kyoto, Japan

[21] Appl. No.: 997,675

[22] Filed: Dec. 28, 1992

[30] Foreign Application Priority Data

Dec. 27, 1991 [JP] Japan .................. 3-346734
Apr. 14, 1992 [JP] Japan .................. 4-094220
May 20, 1992 [JP] Japan .................. 4-127290

[51] Int. Cl.$^6$ .................................. G01P 15/09
[52] U.S. Cl. .................... 73/517 AV; 73/431; 310/329
[58] Field of Search ............ 73/517 AV, 517 R, 493, 73/516 R, 431; 180/282; 307/121, 105 B; 310/315, 319, 329

[56] References Cited

U.S. PATENT DOCUMENTS

| | | | |
|---|---|---|---|
| 3,727,084 | 4/1973 | Epstein | 310/9.5 |
| 4,586,377 | 5/1986 | Schmid | 73/517 R |
| 4,932,259 | 6/1990 | Veno | 73/517 AV |
| 5,052,226 | 10/1991 | Schmid | 73/517 R |

FOREIGN PATENT DOCUMENTS 2641612 7/1990 France .
2231965 11/1990 United Kingdom .

*Primary Examiner*—Hezron E. Williams
*Assistant Examiner*—Helen C. Kwok
*Attorney, Agent, or Firm*—Ostrolenk, Faber, Gerb & Soffen

[57] ABSTRACT

An acceleration sensor has an insulating substrate, a pair of signal deriving electrodes provided on one surface and an acceleration detecting element electrically connected to the pair of electrodes. The acceleration detecting element is provided with first and second piezoelectric elements, having a pair of facing end surfaces, which are directly or indirectly coupled to each other to be polarized in reverse directions. First end surfaces of the first and second piezoelectric elements are electrically connected to the pair of signal deriving electrodes respectively while other end surfaces, being opposite to the first end surfaces, of the first and second piezoelectric elements are electrically connected with each other.

17 Claims, 8 Drawing Sheets

ACCELERATION SENSOR WITH DIRECT MOUNTING

BACKGROUND OF THE INVENTION

1. Field of the Invention

The present invention relates to an acceleration sensor utilizing a piezoelectric element, and more particularly, it relates to an acceleration sensor suitably integrated into an air bag system which is mounted on an automobile, for example.

2. Description of the Background Art

An air bag system which is carried on an automobile is driven in response to acceleration applied upon a collision or the like. In order to ensure the operation of such an air bag system, an acceleration sensor is generally integrated therein. In relation to such an acceleration sensor, there has been proposed a technique of employing a piezoelectric element which is deformed in response to acceleration applied thereto to output an electric signal, as disclosed in U.S. Pat. No. 4,700,973, for example.

An example of a well-known conventional acceleration sensor employing a piezoelectric element is now described with reference to FIGS. 16 and 17.

This acceleration sensor has a piezoelectric element 61 and a hybrid IC 62 including a circuit for processing a detection signal which is outputted from the piezoelectric element 61. An end of the piezoelectric element 61 is fixed to a support member 65 which is fixed onto a metal base plate 63. A free end of the piezoelectric element 61 is deflected by acceleration applied along a direction C which is orthogonal to the surface of the support member 65 supporting the piezoelectric element 61, to output a detection signal responsive to the degree of the acceleration.

The hybrid IC 62 is fixed onto the metal base plate 63. The piezoelectric element 51 and the hybrid IC 62 are electrically connected with each other through lead wires 66. A plurality of pin terminals 67 are mounted to downwardly extend from the metal base plate 63 for electrically connecting the acceleration sensor with an external unit. The piezoelectric element 61 and the hybrid IC 62 are sealed with a cap 64 which is fixed to the metal base plate 63.

In the aforementioned conventional acceleration sensor, the piezoelectric element 51 is supported by the support member 65 in a cantilever manner, so that the piezoelectric element 61 is bent/deformed in response to the acceleration applied thereto. When extremely large acceleration is applied, therefore, the free end portion of the piezoelectric element 61 is remarkably swung. Consequently, the piezoelectric element 61 itself may be broken when the same is exposed to extremely large acceleration or impact of about 2000 G, for example.

While the piezoelectric element 61 and the hybrid IC 62 are connected with each other by the plurality of lead wires 66 in the aforementioned acceleration sensor, the lead wires 66 may be broken due to metal fatigue caused by vibration. In order to prevent such disconnection, it may be effective to increase the diameters of the lead wires 66 thereby improving strength. In this case, however, the lead wires 66 may resonate with vibration following acceleration, to exert a bad influence on the acceleration detecting operation of the piezoelectric element 61.

In the aforementioned acceleration sensor detecting the acceleration along the direction C shown in FIG. 17, further, it is necessary to provide a strong structure in the portion supporting the piezoelectric element 61 so that this portion is not deflected by acceleration. Thus, the piezoelectric element 61 and the hybrid IC 62 are mounted on the metal base plate 63, which in turn closes an opening surface of the cap 64. In such a structure using the heavy and high-priced metal base plate 63, however, the overall acceleration sensor is increased in size while the acceleration sensor itself must be strongly mounted on a target of measurement, and hence the cost is extremely increased.

SUMMARY OF THE INVENTION

The present invention has been proposed in order to solve the aforementioned problems of the conventional acceleration sensor, and an object thereof is to provide an acceleration sensor having small dimensions as a whole, which can improve shock resistance of an acceleration detecting element even if a member having relatively low rigidity is employed, with no necessity for lead wires and a metal base plate.

According to a wide aspect of the present invention, provided is an acceleration sensor which comprises an insulating substrate having a pair of signal deriving electrodes provided on its one major surface and an acceleration detecting element fixed on the major surface of the insulating substrate to be electrically connected to the pair of electrodes. The acceleration detecting element has first and second piezoelectric elements, having a pair of facing end surfaces, which are directly or indirectly coupled to each other and polarized in reverse directions. First end surfaces of the first and second piezoelectric elements are electrically connected each to one of the pair of signal deriving electrodes respectively while other end surfaces, being opposite to the first end surfaces, of the first and second piezoelectric elements are electrically connected with each other.

The first and second piezoelectric elements may be polarized in directions parallel to the major surface of the insulating substrate, or orthogonal to the insulating substrate.

According to the present invention, the acceleration detecting element is fixed to the insulating substrate through the signal deriving electrodes, whereby the acceleration detecting element is hardly broken even if extremely large acceleration is applied to the acceleration sensor. Further, a detection signal outputted from the acceleration detecting element is derived by the pair of signal deriving electrodes, to cause substantially no failure such as disconnection dissimilarly to the conventional acceleration sensor using lead wires.

When the first and second piezoelectric elements are polarized in directions along the major surface of the insulating substrate, acceleration acting along the direction of polarization of each piezoelectric element is detected. Thus, deformation or deflection of the insulating substrate is allowed to some extent in a direction orthogonal to a support surface for the piezoelectric elements, whereby it is not necessary to strongly form the insulating substrate as compared with the conventional acceleration sensor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
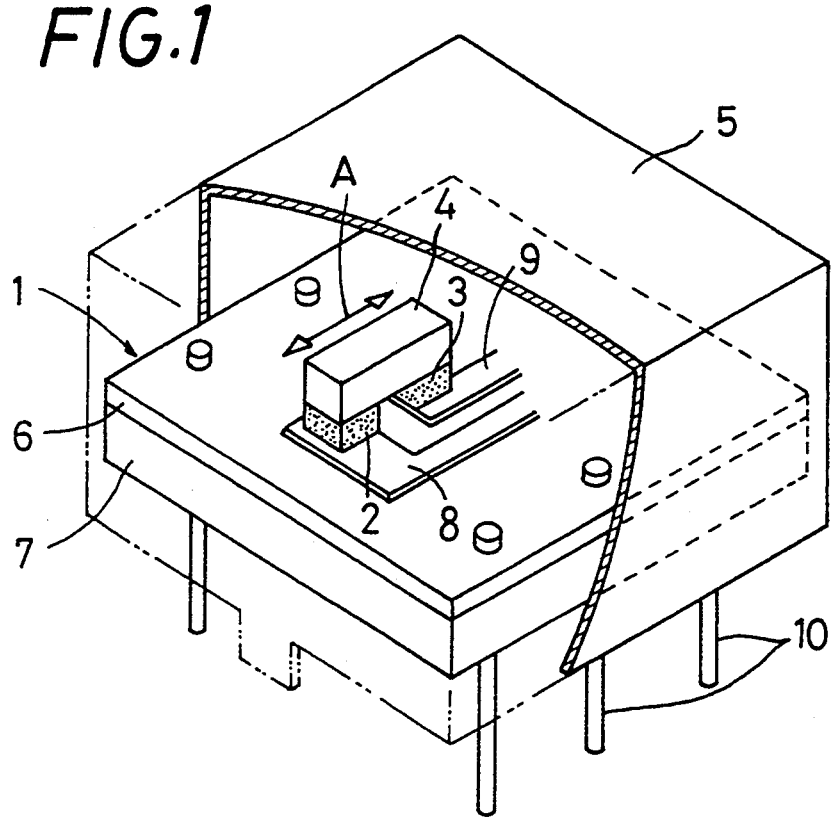
FIG. 1 is a partially fragmented perspective view showing the overall structure of an acceleration sensor according to a first embodiment of the present invention.
Figure 2:
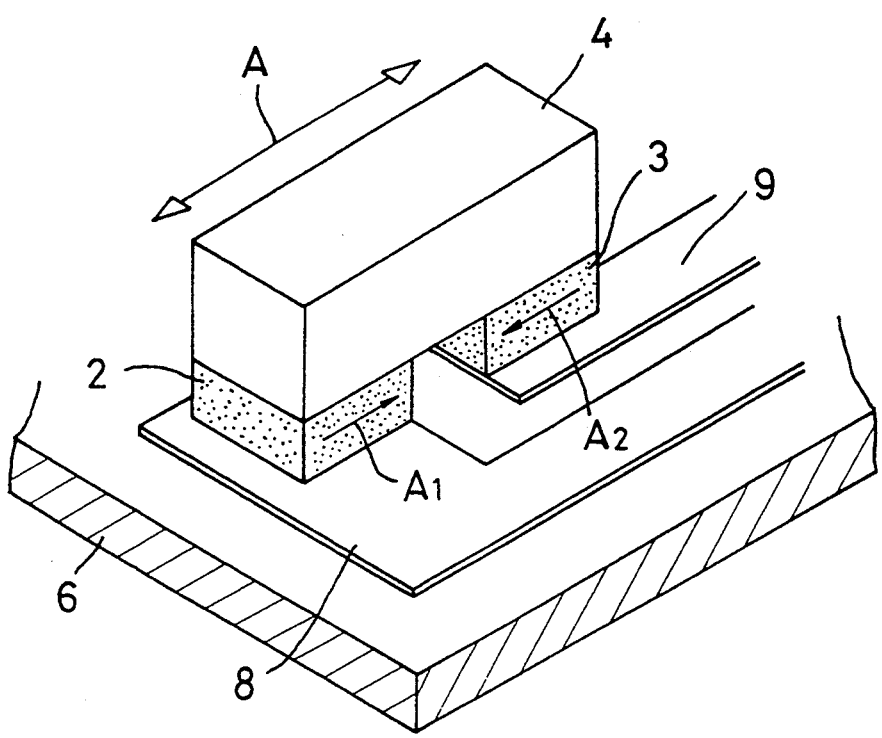
FIG. 2 is an enlarged perspective view showing a principal part of the acceleration sensor shown in FIG. 1.
Figure 3:
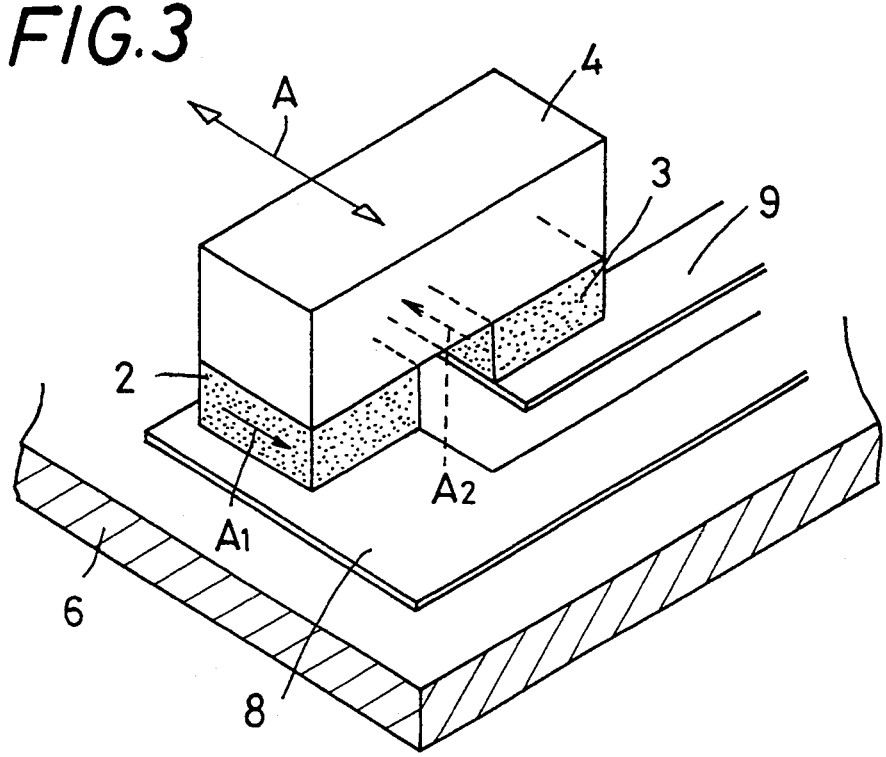
FIG. 3 is an enlarged perspective view showing a modification of the principal part of the acceleration sensor shown in FIG. 2.

FIGS. 1 to 3 are adapted to illustrate a first embodiment of the present invention. FIG. 1 is a partially fragmented perspective view showing the overall structure of an acceleration sensor, FIG. 2 is an enlarged perspective view showing a principal part thereof, and FIG. 3 is an enlarged perspective view showing a modification of the principal part.

In the acceleration sensor according to the present invention, an acceleration detecting element which is formed by a pair of piezoelectric elements 2 and 3 and a coupling member 4 is arranged on a hybrid IC substrate 1, as shown in FIG. 1. A case 5 is mounted to cover the upper surface of the hybrid IC substrate 1, so that the acceleration detecting element is sealed in a space defined by the hybrid IC substrate 1 and the case 5.

While a pair of facing end surfaces of the first and second piezoelectric elements are provided with electrodes throughout the specification, it is noted that such electrodes are omitted in FIGS. 1 to 10 for simplifying illustration.

The hybrid IC substrate 1 is formed by integrating a hybrid IC (not shown) into an insulating substrate 8 having a prescribed thickness. The lower surface of the insulating substrate 6 is filled up with mold resin 7, in order to seal the aforementioned space defined by the hybrid IC substrate 1 and the case 5.

The insulating substrate 6 is provided on its upper surface with at least a pair of signal deriving electrodes 8 and 9 which are electrically connected with the hybrid IC integrated therein. Further, a plurality of downwardly extending pin terminals 10 are mounted on the hybrid IC substrate 1. The plurality of pin terminals 10 are provided to electrically connect the acceleration sensor with an external unit.

The hybrid IC may be formed independently of the insulating substrate 6, although such a structure is not shown in the figures. For example, a separately prepared hybrid IC may be mounted on the lower surface of the insulating substrate 6.

The insulating substrate 6 forming the hybrid IC substrate 1 is provided on its upper surface with the pair of signal deriving electrodes 8 and 9 which are separated at a prescribed interval. The first and second piezoelectric elements 2 and 3 are bonded onto the electrodes 8 and 9 respectively. These piezoelectric elements 2 and 3 are polarized in directions shown by arrows $A_1$ and $A_2$ in FIG. 2 respectively. These directions $A_1$ and $A_2$ are along the major surface of the insulating substrate 6, and reverse to each other.

According to this embodiment, the coupling member 4 is formed by a metal block of a metal such as a nickel alloy. This coupling member 4 may alternatively be formed by another conductive material in place of a metal.

The coupling member 4 is arranged over the piezoelectric elements 2 and 3 and fixed to the upper surfaces thereof so that its lower surface is in contact with the upper surfaces of the first and second piezoelectric elements 2 and 3. Since the coupling member 4 is formed by a conductive material as described above, the upper surfaces of the first and second piezoelectric elements 2 and 3 are electrically connected with each other through the coupling member 4.

According to this embodiment, the coupling member 4 is formed by a metal block as described above, in order to apply mass of a certain degree to the first and second piezoelectric elements 2 and 3. This coupling member 4 may alternatively be formed by a non-conductive material so far as the same can serve as a mass applying member. In this case, a conductive layer may be provided on the lower surface of the coupling member 4, to electrically connect the piezoelectric elements 2 and 3 with each other.

The case 5 is formed by working a metal thin plate or the like into a rectangular parallelopiped having an opening in its lower portion, as shown in FIG. 1. This case 5 is so sized as to receive the insulating substrate 6 therein. The insulating substrate 6 is inserted in the case 5 from the opening provided in its lower portion as shown in FIG. 1, so that the piezoelectric elements 2 and 3 and the coupling member 4 are arranged in the space defined by the case 5 and the insulating substrate 6. The lower opening of the case 5 is sealed with the aforementioned mold resin 7.

When acceleration externally acts along arrow A (see FIG. 2) in the direction of arrangement of the piezoelectric elements 2 and 3, the coupling member 4 is swung along the acceleration acting direction A. Consequently, the coupling member 4 is moved along the major surface of the insulating substrate 6, whereby the first and second piezoelectric elements 2 and 3 arranged between the coupling member 4 and the insulating substrate 6 are so distorted that opposite-polarity charges are generated on both end surfaces, i.e., upper and lower surfaces of the piezoelectric elements 2 and 3. Assuming that positive charges are generated on the upper surface of the first piezoelectric element 2, negative charges are generated on that of the second piezoelectric element 3 since the piezoelectric elements are reversely polarized and displaced surfaces, i.e., the upper surfaces thereof are electrically connected with each other through the coupling member 4, whereby the positive and negative charges are canceled by conduction through the coupling member 4. Since the piezoelectric elements 2 and 3 are connected in series across the electrodes 8 and 9, the electrodes 8 and 9 derive the charges generated on the fixed end surfaces, i.e., the lower surfaces of the piezoelectric elements 2 and 3, thereby detecting the direction and the degree of the acceleration acting on the acceleration sensor.

According to the first embodiment, the insulating substrate 6 is hardly deformed by the acceleration to be detected since the acceleration acts in the direction A along the major surface of the insulating substrate 6. Even if the insulating substrate 6 is deformed by an acceleration component acting in a direction different from the above, such deformation is caused along a direction which is different from that of distortion of the piezoelectric elements 2 and 3 in detection of the acceleration. Thus, the acceleration detecting operation by the piezoelectric elements 2 and 3 is not much influenced by such deformation. According to this embodiment, therefore, the insulating substrate 6 may not be prepared from a material having high rigidity, and it is not necessary to provide a structure for strongly supporting the insulating substrate 6 and the acceleration sensor.

The first and second piezoelectric elements 2 and 5 may be polarized in directions reverse to those shown in FIG. 2. In other words, the piezoelectric elements 2 and 3 may be polarized along arrows $A_2$ and $A_1$ respectively.

Alternatively, the piezoelectric elements 2 and 3 may be polarized in directions $A_1$ and $A_2$ which are orthogonal to the direction of arrangement of the piezoelectric elements 2 and 3, as shown in FIG. 3. In this case, acceleration acts in a direction A perpendicular to that of arrangement of the piezoelectric elements 2 and 3.

Figure 4:
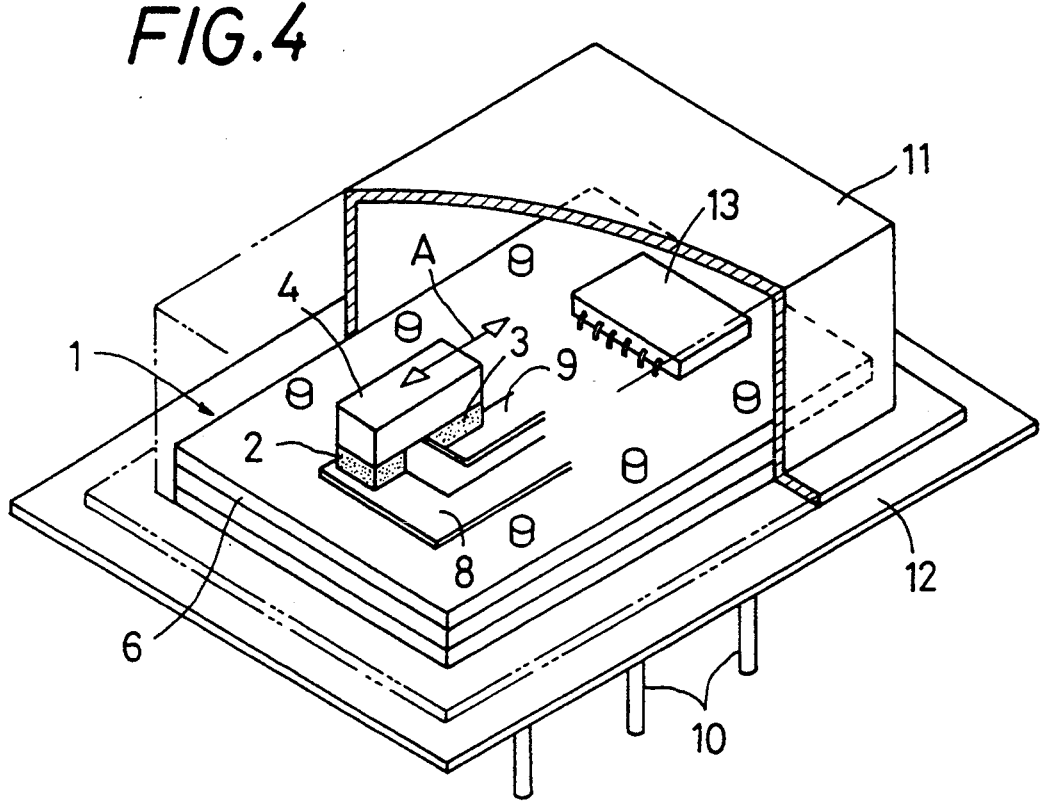
FIG. 4 is a partially fragmented perspective view showing an acceleration sensor according to a second embodiment of the present invention.

FIG. 4 is a partially fragmented perspective view showing the overall structure of an acceleration sensor according to a second embodiment of the present invention. The acceleration sensor according to the second embodiment is formed by a surface mounting type hybrid IC substrate 1. This hybrid IC substrate 1 is sealed in a space which is defined by a metal base plate 12 and a case 11 connected thereto.

According to this embodiment, not only first and second piezoelectric elements 2 and 3 and a coupling member 4 but another electronic component 13 and the like are mounted on the upper surface of an insulating substrate 6 forming the hybrid IC substrate 1. Other structures of this embodiment are similar to those of the aforementioned first embodiment. Therefore, corresponding elements are denoted by the same reference numerals, to omit redundant description. The acceleration detecting operation of the acceleration sensor according to this embodiment is also similar to that of the first embodiment.

Figure 5:
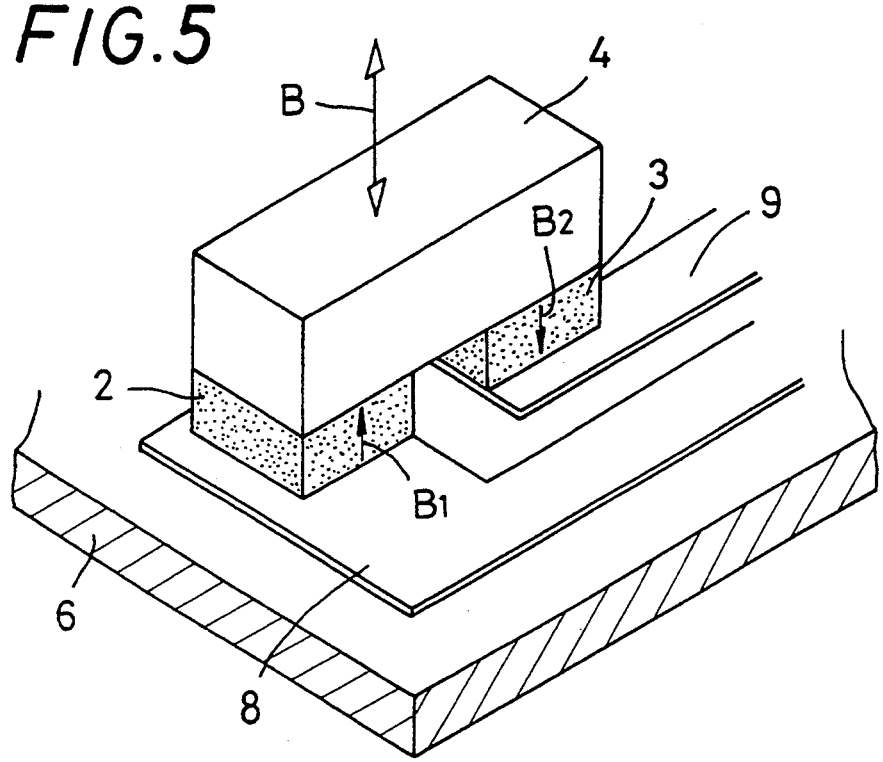
FIG. 5 is an enlarged perspective view showing a principal part of an acceleration sensor according to a third embodiment of the present invention.
Figure 6:
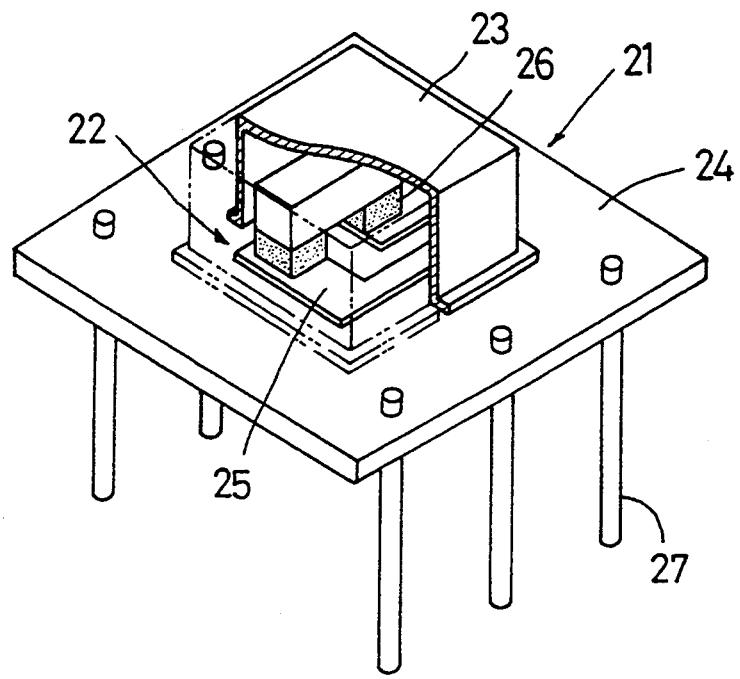
FIG. 6 is a partially fragmented perspective view showing the overall structure of an acceleration sensor according to a fourth embodiment of the present invention.

FIG. 5 is an enlarged perspective view showing a principal part of an acceleration sensor according to a third embodiment of the present invention. In this embodiment, first and second piezoelectric elements 2 and 3 are polarized in directions orthogonal to the major surface of an insulating substrate 6. Namely, the piezoelectric elements 2 and 3 are polarized in directions $B_1$ and $B_2$ which are orthogonal to the major surface of the insulating substrate 6 and reverse to each other. Thus, it is possible to detect acceleration acting in a vertical direction B which is orthogonal to the insulating substrate 6. According to the third embodiment, it is necessary to improve rigidity of the insulating substrate 6 and strongly support the same since the acceleration to be detected acts along the direction for deflecting the insulating substrate 6.

Also in the third embodiment, the first and second piezoelectric elements 2 and 3 are hardly broken even if excessive acceleration is applied thereto since the acceleration detecting element is supported by the insulating substrate 6 in a surface contact manner. Thus, shock resistance of this embodiment is extremely improved as compared with the conventional acceleration sensor.

Further, the piezoelectric elements 2 and 3 are electrically connected with each other by a coupling member 4 so that a detection signal is derived from the same through electrodes 8 and 9 which are formed on the insulating substrate 6 similarly to the acceleration sensors according to the first and second embodiments, whereby it is possible to omit lead wires. Thus, no failure is caused by breaking of lead wires dissimilarly to the conventional acceleration sensor, and it is possible to prevent an imperfect acceleration detecting operation caused by resonance of such lead wires.

Figure 7:
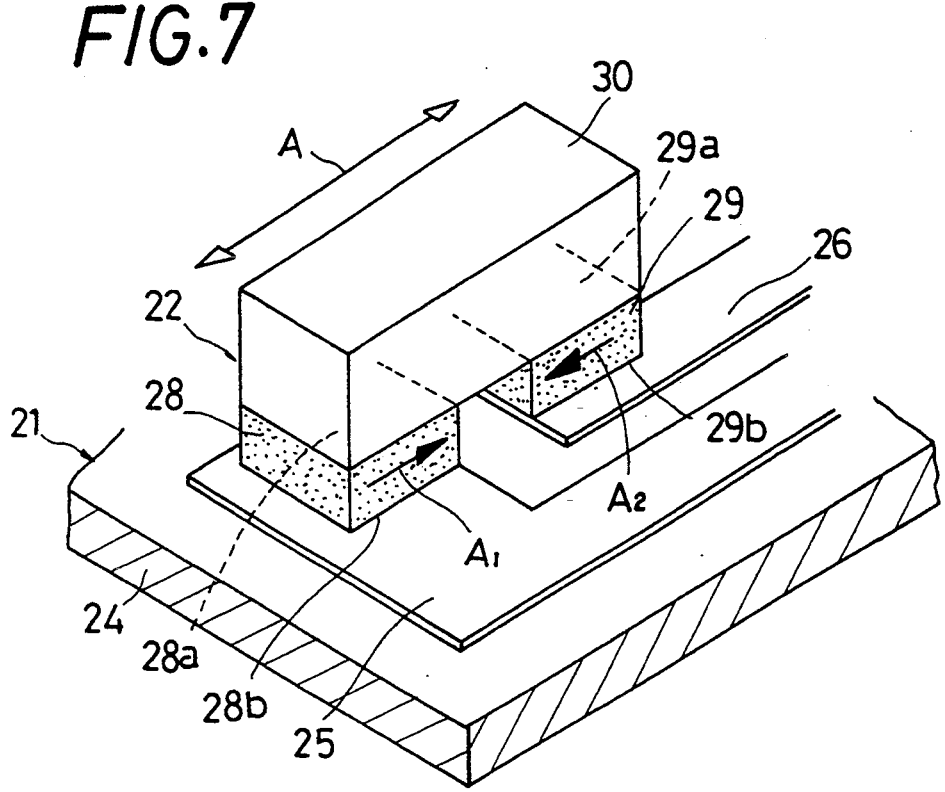
FIG. 7 is an enlarged perspective view showing a principal part of the acceleration sensor shown in FIG. 6.

FIG. 5 is a partially fragmented perspective view showing the overall structure of an acceleration sensor according to a fourth embodiment of the present invention, and FIG. 7 is an enlarged perspective view showing an acceleration detecting element forming a principal part thereof.

The acceleration sensor according to the fourth embodiment comprises a hybrid IC substrate 21, an acceleration detecting element 22, and a shielding case 23 which is fixed to the surface of the hybrid IC substrate 21 to cover only a portion around the acceleration detecting element 22.

As shown in FIG. 5, the hybrid IC substrate 21 is formed by integrating a hybrid IC (not shown) including a circuit for processing a detection signal which is outputted from the acceleration detecting element 22 into an insulating substrate 24 having a prescribed thickness. The insulating substrate 24 is provided on its upper surface with at least a pair of signal deriving electrodes 25 and 26 which are connected with the integrated hybrid IC and separated from each other at a prescribed interval.

The acceleration detecting element 22 is arranged across the pair of electrodes 25 and 26. On the other hand, the hybrid IC substrate 21 itself is provided with a plurality of downwardly extending pin terminals 27 for external connection. These pin terminals 27 pass through the hybrid IC substrate 21 along the direction of its thickness, to downwardly project from the same.

As shown in FIG. 7, the acceleration detecting element 22 has first and second piezoelectric elements 28 and 29 which are electrically connected with the electrodes 25 and 26 respectively. Namely, the first and second piezoelectric elements 28 and 29 are so fixed that lower surfaces thereof are in contact with upper surfaces of the electrodes 25 and 26. As clearly understood from FIG. 7, the first and second piezoelectric elements 28 and 29 are polarized in directions $A_1$ and $A_2$ which are along the major surface of the insulating substrate 24 and reverse to each other. The first and second piezoelectric elements 28 and 29 are coupled with each other by a coupling member 30, which is formed similarly to the coupling member 4 employed in the first embodiment. This coupling member 30 electrically connects upper surfaces 28a and 29a of the piezoelectric elements 28 and 29 with each other, and applies mass to the piezoelectric elements 28 and 29.

On the other hand, lower surfaces 28b and 29b of the piezoelectric elements 28 and 29 are electrically connected to the aforementioned pair of electrodes 25 and 26.

The piezoelectric elements 28 and 29 and the signal deriving electrodes 25 and 28 are fixed to each other through a conductive adhesive, while the coupling member 30 is also fixed to the upper surfaces 28a and 29a of the piezoelectric elements 28 and 29 through a conductive adhesive or the like.

The piezoelectric elements 28 and 29 may be polarized reversely to the directions $A_1$ and $A_2$ shown in FIG. 7. Further, the coupling member 30 may be formed by a nonconductive material such as a ceramics so that a conductive layer is formed on its lower surface, similarly to the first embodiment.

Referring again to FIG. 6, the shielding case 23, which is made of a metal or synthetic resin, is in the form of a rectangular tube. This shielding case 23 is fixed to the major surface of the hybrid substrate 21 through an insulating adhesive (not shown) or the like, to cover only a portion provided with the pair of piezoelectric elements 28 and 29 and the coupling member 30 forming the acceleration detecting element 22. The shielding case 23 may not necessarily be used since the same is mounted in response to working conditions of the acceleration sensor etc.

When acceleration externally acts along the direction of arrangement of the first and second piezoelectric elements 28 and 29, i.e., along arrow A shown in FIG. 7 in the acceleration sensor according to the fourth embodiment, opposite-polarity charges are generated on the fixed end surfaces, i.e., the lower surfaces 28b and 29b of the first and second piezoelectric elements 28 and 29 similarly to the first embodiment, to be derived through the pair of signal deriving electrodes 25 and 26. Thus, the direction and the degree of the acceleration acting on the acceleration detecting element 22 are detected similarly to the first embodiment.

Also in the fourth embodiment, the hybrid IC substrate 21 is hardly deformed by the acceleration to be detected, since this acceleration acts in the direction A which is parallel to the surface of the hybrid IC substrate 21. Even if an acceleration component acts in a direction which is different from that along arrow A to deform the hybrid IC substrate 21, such deformation is caused along a direction which is different from those of distortion of the piezoelectric elements 28 and 29 in detection of the acceleration. Therefore, the acceleration detecting operation of the piezoelectric elements 28 and 29 is not much influenced by such deformation. Thus, it is not necessary to particularly improve rigidity of the hybrid IC substrate 21 or strongly support the same.

Figure 8:
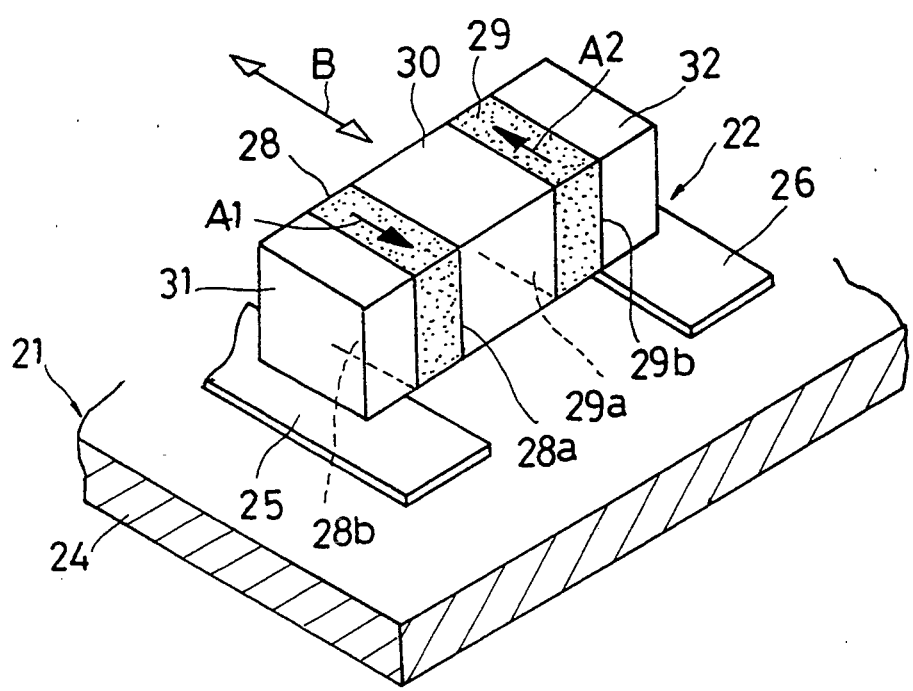
FIG. 8 is a perspective view showing a modification of an acceleration detecting element.
Figure 9:
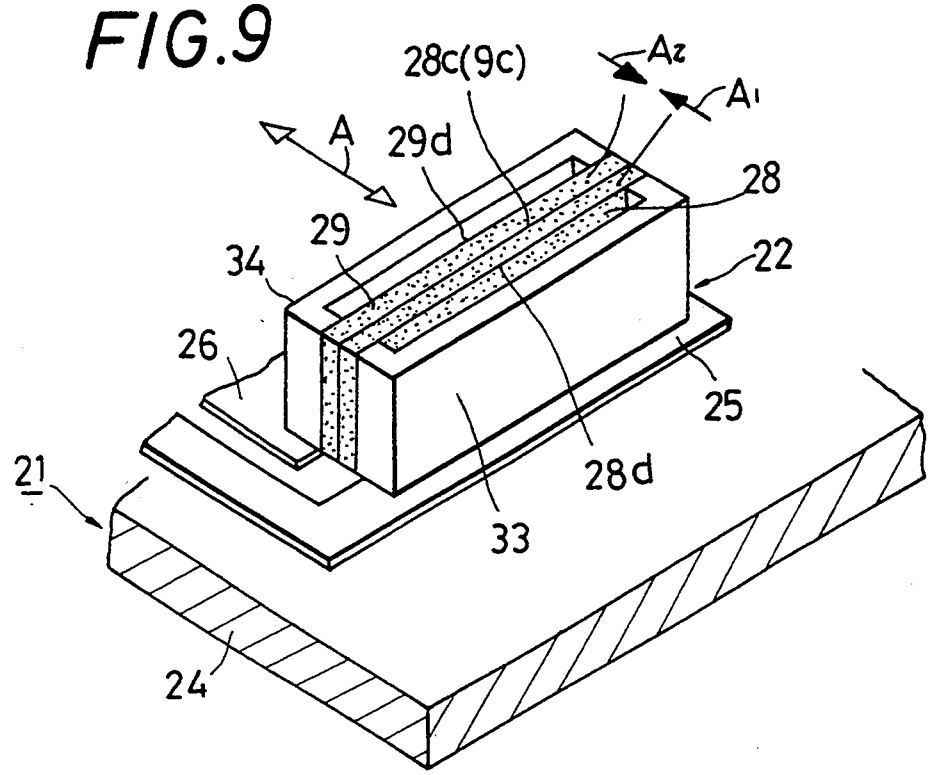
FIG. 9 is a perspective view showing another modification of the acceleration detecting element.

FIGS. 8 and 9 show modifications of the aforementioned acceleration detecting element 22.

In an acceleration detecting element 22 shown in FIG. 8, first and second piezoelectric elements 28 and 29 are coupled with each other by a coupling member 30, while support members 31 and 32 are coupled to outer sides of the piezoelectric elements 28 and 29. While the first and second piezoelectric elements 28 and 29 are polarized in directions $A_1$ and $A_2$ which are reverse to each other along the major surface of an insulating substrate 24 as shown in FIG. 8, both end surfaces of the first and second piezoelectric elements 28 and 29 are orthogonal to the insulating substrate 24. In other words, the piezoelectric elements 28 and 29 are so arranged that both end surfaces thereof are orthogonally directed to the insulating substrate 24. Inner end surfaces 28a and 29a of the piezoelectric elements 28 and 29 are coupled with each other by the coupling member 30, while outer end surfaces 28b and 29b thereof are coupled with the support members 31 and 32.

The coupling member 30 is formed by a conductive material or a material having conductive surfaces, which is capable of applying a certain degree of mass to the piezoelectric elements 28 and 29, similarly to the coupling member 30 shown in FIG. 7. The support members 31 and 32 are also formed by a conductive material or a material having conductive surfaces. Thus, the inner end surfaces 28a and 29a of the piezoelectric elements 28 and 29 are electrically connected with each other by the coupling member 30, while the outer end surfaces 28b and 29b thereof are electrically connected to electrodes 25 and 26 through the support members 31 and 32 respectively.

The acceleration detecting element 22 shown in FIG. 8 performs an acceleration detecting operation similarly to that shown in FIG. 7 when acceleration acts along a direction B which is orthogonal to that of arrangement of the piezoelectric elements 28 and 29. Also in the acceleration detecting element 22 shown in FIG. 8, the coupling member 30 having a certain degree of mass is moved in response to the acceleration acting along the direction B, whereby opposite-polarity charges are generated on the fixed end surfaces 28b and 29b of the piezoelectric elements 28 and 29 so that a signal responsive to the charges is derived from the electrodes 25 and 26.

In an acceleration detecting element 22 shown in FIG. 9, on the other hand, first and second piezoelectric elements 28 and 29 are in the form of elongated rectangular plate type members, first end surfaces of which are directly coupled to be integrated with each other. The first and second piezoelectric elements 28 and 29 are polarized in directions $A_1$ and $A_2$ which are parallel to the major surface of an insulating substrate 24 as shown in FIG. 9, while the directions $A_1$ and $A_2$ are reverse to each other. Outer end surfaces 28d and 29d of the first and second piezoelectric elements 28 and 29 are respectively bonded with conductive support members 33 and 34, which are electrically connected with and fixed to electrodes 25 and 26 respectively.

The conductive support members 33 and 34 are bonded only in portions which are close to both ends of the first and second piezoelectric elements 28 and 29, so that the central portions of the first and second piezoelectric elements 28 and 29 are deformable. When acceleration acts along arrow A, therefore, the central portions of the first and second piezoelectric elements 28 and 20 are so deflected that opposite-polarity charges are generated on the outer end surfaces 28d and 20d thereof and a signal caused by the opposite-polarity charges is derived from the electrodes 25 and 26.

Also in the modified acceleration detecting element shown in FIG. 8 or 9, the acceleration acts in the direction along the major surface of the hybrid IC substrate 21, whereby the insulating substrate 24 and the hybrid IC substrate 21 are hardly deformed upon application of acceleration. Further, no lead wires are required since the acceleration detecting element 22 is directly fixed to the electrodes 25 and 28, similarly to the first embodiment. Thus, the acceleration sensor is free from disconnection caused by lead wires and a malfunction caused by resonance of such lead wires.

Figure 10:
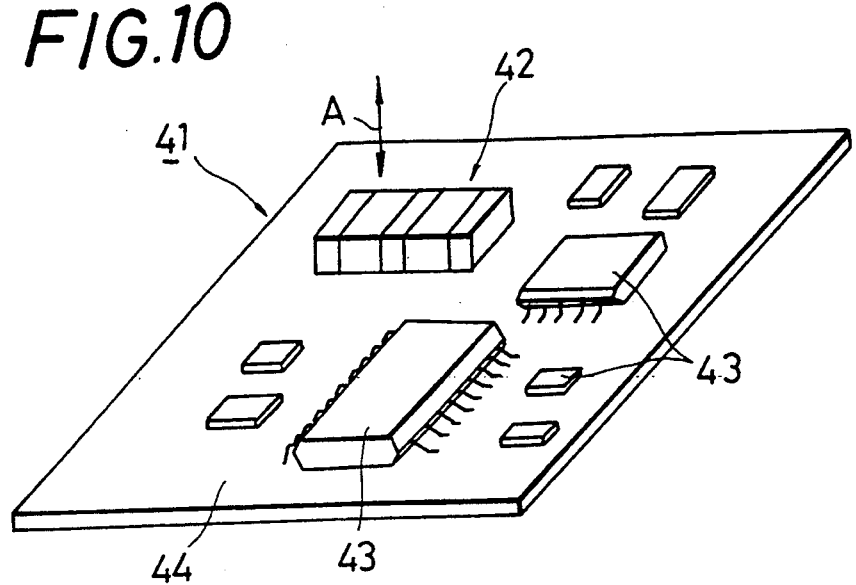
FIG. 10 is a perspective view schematically showing the structure of an acceleration sensor according to a fifth embodiment of the present invention.

FIG. 10 is a perspective view showing a schematic structure of an acceleration sensor 41 according to a fifth embodiment of the present invention. This acceleration sensor 41 is formed by an insulating substrate 44, on which an acceleration detecting element 42 and various electronic components 45 containing a circuit for processing a signal outputted from the acceleration detecting element 42 are mounted. A necessary interconnection pattern (not shown) is formed on the insulating substrate 44 by thick film printing or the like. Electrodes of the acceleration detecting element 42 and the various electronic components 43 are mounted on this interconnection pattern by soldering or with a conductive adhesive. The interconnection pattern includes a pair of signal deriving electrodes which are electrically connected to the acceleration detecting element 42, similarly to the first to fourth embodiments.

Figure 11:
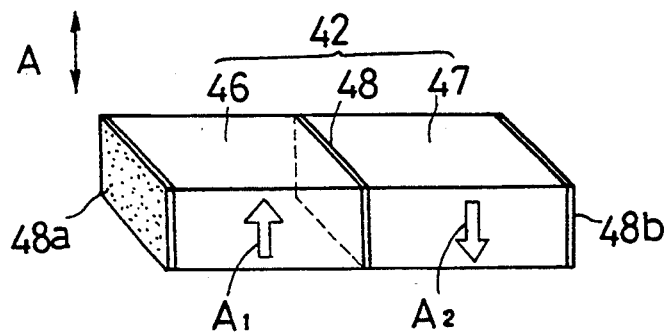
FIG. 11 is a perspective view schematically showing still another modification of the acceleration detecting element.

FIG. 11 is a perspective view showing the acceleration detecting element 42 which is employed in the acceleration sensor 41 according to this embodiment. The acceleration detecting element 42 is provided with first and second piezoelectric elements 46 and 47, which are arranged along a direction different from, e.g., orthogonal to an acceleration acting direction A, and bonded to each other. The first and second piezoelectric elements 46 and 47 are polarized in directions along the acceleration acting direction A reversely to each other. Referring to FIG. 11, symbols $A_1$ and $A_2$ denote the directions of polarization of the first and second piezoelectric elements 46 and 47 respectively.

In FIG. 11, an electrode 48 is formed by bonding electrodes which are formed on one end surfaces of the piezoelectric elements 46 and 47 with each other through a conductive adhesive. On the other hand, electrodes 48a and 48b are formed on other end surfaces of the first and second piezoelectric elements 46 and 47 respectively.

The aforementioned acceleration detecting element 42 serves as the so-called shearing type piezoelectric element, so that distortion is caused by acceleration in a direction displaced in a plane which is parallel to an electrical axis. When acceleration is applied to the acceleration detecting element 42, therefore, a voltage signal which is proportional to the direction and the degree of the acceleration is outputted from the electrodes 48a and 48b provided on both sides thereof. This output signal is processed by the electronic components 43 through the interconnection pattern which is formed on the insulated substrate 44 shown in FIG. 10. As hereinabove described, the interconnection pattern includes a pair of signal deriving electrodes, which are electrically connected with the electrodes 48a and 48b of the acceleration detecting element 42 respectively. Except the structure of the acceleration detecting element 42, the acceleration sensor of this embodiment can be formed similarly to the first to fourth embodiments, and hence redundant description is omitted.

Since the electrodes 48a and 48b provided on both sides of the acceleration detecting element 42 are supported by the interconnection pattern, a clearance is defined between the lower surface of the body of the acceleration detecting element 42 and the insulating substrate 44, to ensure a vibration space for the acceleration detecting element 42.

In the acceleration sensor according to the fifth embodiment, the acceleration detecting element 42 is directly fixed to the signal deriving electrodes provided in the interconnection pattern, whereby it is possible to electrically connect the acceleration detecting element 42 to the signal processing circuit with no employment of lead wires. Therefore, neither breaking of lead wires nor characteristic deterioration resulting from resonance of lead wires is caused similarly to the first to fourth embodiments. Further, the first and second piezoelectric elements 46 and 47 are polarized in the directions along the acceleration acting direction A to form the acceleration detecting element 42 as the so-called shearing type one, whereby it is possible to form an acceleration sensor by mounting the acceleration detecting element 42 on an insulating substrate as a single component, as described above. Thus, generation of pyroelectric noise as well as different axis sensitivity can be reduced and it is possible to improve mechanical hardness while simplifying the acceleration sensor in structure and miniaturizing the same.

FIGS. 12 to 15 are perspective views showing modifications of the acceleration detecting element employed in the fifth embodiment, in correspondence to FIG. 11.

Figure 12:
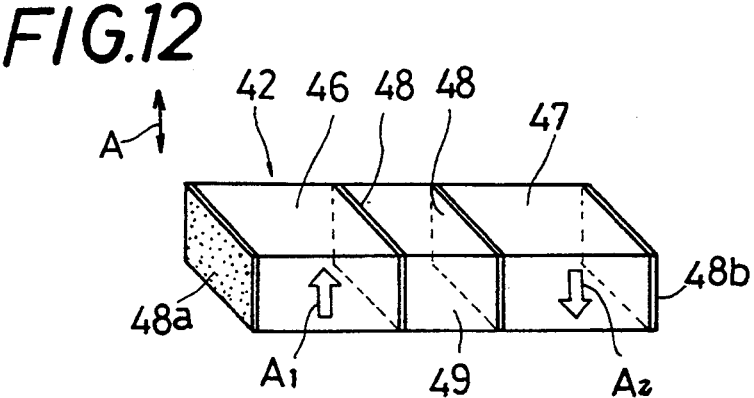
FIG. 12 is a perspective view schematically showing a further modification of the acceleration detecting element.

An acceleration detecting element 42 shown in FIG. 12 is different from that shown in FIG. 11 only in a point that a coupling member 49 is interposed between first and second piezoelectric elements 46 and 47. The coupling member 49 can be formed by a material similar to that for the coupling member 30 shown in FIG. 8, i.e., a metal or an insulating material whose surfaces are covered with conductive films. This coupling member 49 electrically connects electrodes 48 which are formed on one end surfaces of the first and second piezoelectric elements 46 and 47 with each other. The coupling member 49 must be formed by a material having a certain degree of mass, so that the same is moved in a direction A when acceleration acts in this direction A, whereby the piezoelectric elements 46 and 47 are distorted and an electrical signal responsive to the direction and the degree of the acceleration is outputted from electrodes 48a and 48b.

Since the coupling member 49 is provided for serving as a mass applying member, the acceleration detecting element 42 shown in FIG. 12 is improved in sensitivity as compared with that shown in FIG. 11.

Figure 13:
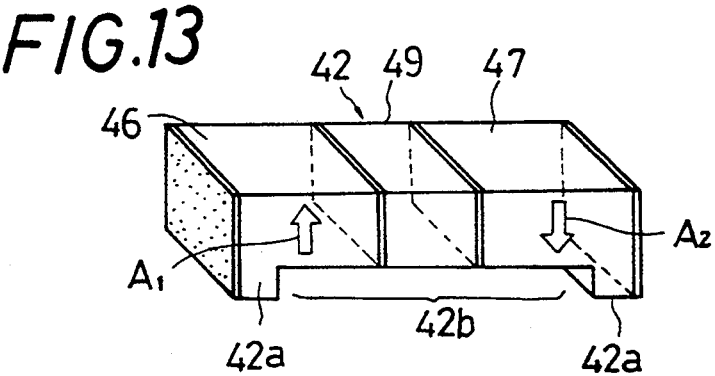
FIG. 13 is a perspective view schematically showing a further modification of the acceleration detecting element.

As shown in FIG. 13, on the other hand, it is possible to further reliably ensure a vibration space for an acceleration detecting element 42 by reducing a central portion 42b of the acceleration detecting element 42, including a portion close to those of first and second piezoelectric elements 46 and 47 bonded to a coupling member 49, and the coupling member 49 in sectional area as compared with outer portions 42a of the piezoelectric elements 45 and 47.

Figure 14:
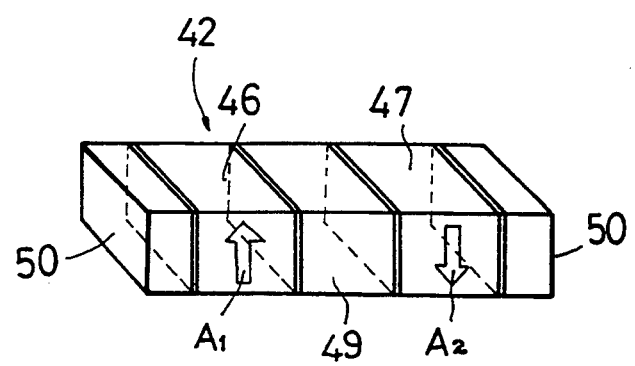
FIG. 14 is a perspective view schematically showing a further modification of the acceleration detecting element.
Figure 15:
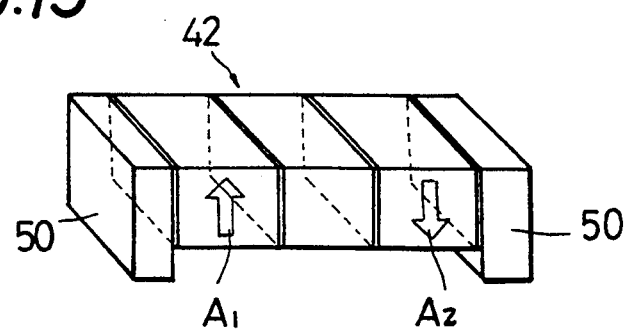
FIG. 15 is a perspective view schematically showing a further modification of the acceleration detecting element.
Figure 16:
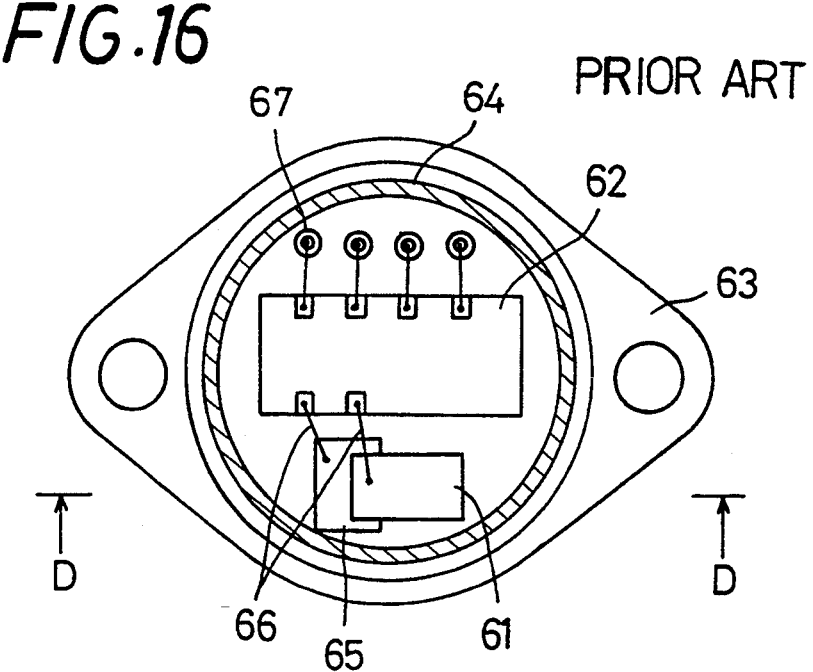
FIG. 16 is a plan sectional view showing an example of a conventional acceleration sensor.
Figure 17:
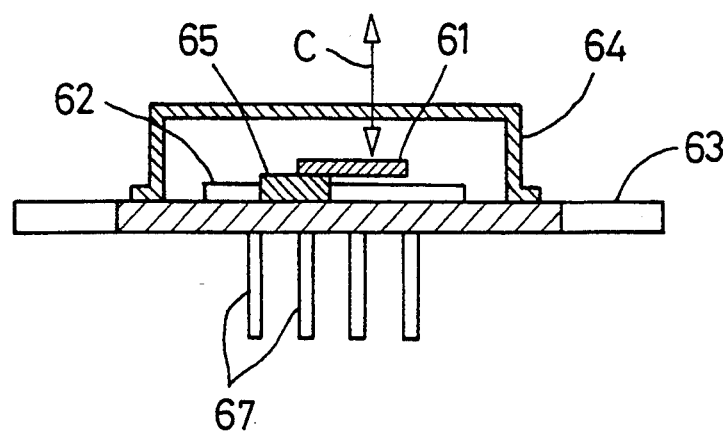
FIG. 17 is a sectional view taken along the line D—D in FIG. 16.

Further, conductive support members 50 may be bonded to outer sides of first and second piezoelectric elements 46 and 47 in an acceleration detecting element 42, as shown in FIG. 14. In such an acceleration detecting element 42 shown in FIG. 14, the conductive support members 50 may be formed by those having larger areas in surfaces bonded to first and second piezoelectric elements 46 and 47 as compared with the piezoelectric elements 46 and 47 and a coupling member 49 held therebetween, as shown in FIG. 15. In the acceleration detecting element 42 shown in FIG. 15, the portion held between the conductive support members 50, i.e., a vibration space for the body of the acceleration detecting element 42, is sufficiently ensured when the conductive support members 50 are electrically connected with and fixed to signal deriving electrodes in the directions shown in this figure.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An acceleration sensor comprising:
    an insulating substrate having a pair of signal deriving electrodes formed directly on an upper surface thereof; and
    an acceleration detecting element fixed to and electrically connected to said pair of signal deriving electrodes so as to secure said acceleration detecting element, via said electrodes, to said insulating substrate,
    said acceleration detecting element including first and second piezoelectric elements each having a pair of facing end surfaces and being coupled with each other, said first and second piezoelectric elements being polarized in reverse directions,
    wherein first end surfaces of each of said first and second piezoelectric elements are electrically connected to said pair of signal deriving electrodes respectively, and opposite end surfaces of each of said first and second piezoelectric elements are electrically connected to each other.

2. An acceleration sensor of claim 1, wherein said first and second piezoelectric elements are polarized in directions parallel to said upper surface of said insulating substrate.

3. An acceleration sensor of claim 1, wherein said first and second piezoelectric elements are polarized in directions orthogonal to said insulating substrate.

4. An acceleration sensor of claim 1, wherein said electrically connected opposite end surfaces of each of said first and second piezoelectric elements are directly bonded to each other.

5. An acceleration sensor of claim 1, further comprising a coupling member for coupling said opposite end surfaces of each of said first and second piezoelectric elements with each other.

6. An acceleration sensor of claim 5, wherein said coupling member comprises conductive surfaces being coupled to said first and second piezoelectric elements.

7. An acceleration sensor of claim 6, wherein said coupling member is made of a metal.

8. An acceleration sensor of claim 5, wherein lower surfaces, being said first end surfaces of said first and second piezoelectric elements are bonded to said pair of signal deriving electrodes respectively,
    said coupling member being bonded to upper surfaces, being said opposite surfaces, of each of said first and second piezoelectric elements over said first and second piezoelectric elements.

9. An acceleration sensor of claim 5, wherein said coupling member is formed by a mass applying member applying a specified degree of mass to said first and second piezoelectric elements.

10. An acceleration sensor of claim 1, wherein said acceleration detecting element further comprises first and second conductive support members bonded to said first end surfaces of each of said first and second piezoelectric elements respectively,
    said first and second conductive support members being electrically connected to said pair of signal deriving electrodes respectively.

11. An acceleration sensor of claim 1, wherein said insulating substrate is a part of a hybrid IC substrate.

12. An acceleration sensor of claim 1, wherein a shielding case is fixed to said insulating substrate from said upper surface thereof to cover at least said acceleration detecting element fixed on said upper surface of said insulating substrate.

13. An acceleration sensor of claim 1, wherein said first and second piezoelectric elements are arranged along directions different from an acceleration acting direction and bonded to each other,
    said first and second piezoelectric elements being polarized in directions along said acceleration acting direction.

14. An acceleration sensor of claim 13, further comprising a coupling member arranged between said first and second piezoelectric elements, said first end surfaces of each of said first and second piezoelectric elements being connected to each other through said coupling member.

15. An acceleration sensor of claim 14, wherein said coupling member is a mass applying member having conductivity.

16. An acceleration sensor of claim 15, wherein said first and second piezoelectric elements and said coupling member form a vibration space in the form of a longitudinal notch for said acceleration detecting element.

17. An acceleration sensor of claim 13, wherein said first and second piezoelectric elements are arranged along directions orthogonal to said acceleration acting direction and connected to each other.

* * * * *